US011007823B2

(12) United States Patent
Arai (10) Patent No.: US 11,007,823 B2
(45) Date of Patent: May 18, 2021

(54) TIRE

(71) Applicant: SUMITOMO RUBBER INDUSTRIES, LTD., Hyogo (JP)

(72) Inventor: Hiroshi Arai, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 304 days.

(21) Appl. No.: 15/961,881

(22) Filed: Apr. 25, 2018

(65) Prior Publication Data

US 2019/0039418 A1  Feb. 7, 2019

(30) Foreign Application Priority Data

Aug. 7, 2017 (JP) .............................. JP2017-152202

(51) Int. Cl.
*B60C 11/12* (2006.01)
*B60C 11/03* (2006.01)
*B60C 11/13* (2006.01)

(52) U.S. Cl.
CPC ...... *B60C 11/1204* (2013.01); *B60C 11/0304* (2013.01); *B60C 11/0306* (2013.01); *B60C 2011/0341* (2013.01); *B60C 2011/0346* (2013.01); *B60C 2011/0372* (2013.01); *B60C 2011/0381* (2013.01); *B60C 2011/0383* (2013.01); *B60C 2011/1209* (2013.01); *B60C 2011/1213* (2013.01); *B60C 2011/133* (2013.01)

(58) Field of Classification Search
CPC ..... B60C 2011/0372; B60C 2011/0374; B60C 2011/0365; B60C 2011/0346
See application file for complete search history.

(56) References Cited

U.S. PATENT DOCUMENTS

| 2014/0238567 | A1* | 8/2014 | Iwasaki | B60C 11/0306 152/209.18 |
|---|---|---|---|---|
| 2016/0121658 | A1* | 5/2016 | Skurich | B60C 11/0309 152/209.18 |
| 2016/0193884 | A1* | 7/2016 | Takemoto | B60C 11/1236 152/209.18 |
| 2016/0303919 | A1* | 10/2016 | Yamaoka | B60C 11/1307 |
| 2017/0015144 | A1* | 1/2017 | Ogihara | B60C 11/1307 |

(Continued)

FOREIGN PATENT DOCUMENTS

JP  2012179965 A  *  9/2012
JP  2017087861      5/2017

*Primary Examiner* — Jacob T Minskey
*Assistant Examiner* — Virak Nguon
(74) *Attorney, Agent, or Firm* — JCIPRNET (57) ABSTRACT

Provided is a tire in which a first land portion partitions a first main groove from a second main groove. A first lug groove and a first sipe are provided in the first land portion. One end of the first lug groove communicates with the first main groove. The first sipe includes one end communicating with the second main groove and another end communicating with another end of the first lug groove. The first sipe includes a steeply inclined portion extending from the another end of the first lug groove and having an angle with respect to a tire circumferential direction smaller than that of the first lug groove, and a gently inclined portion extending from the steeply inclined portion to the second main groove and having an angle with respect to the tire circumferential direction larger than that of the steeply inclined portion.

14 Claims, 6 Drawing Sheets

(56) References Cited

U.S. PATENT DOCUMENTS

2017/0182847 A1* 6/2017 Fujii .................... B60C 11/033
2018/0162174 A1* 6/2018 Wieland .............. B60C 11/0309
2018/0354312 A1* 12/2018 Scheifele ............ B60C 11/1281

* cited by examiner

ON TIRE EQUATOR C SIDE　　　　　　　ON INNER TREAD END Ti SIDE

FIG. 6

TIRE

CROSS-REFERENCE TO RELATED APPLICATION

This application claims the priority of Japan patent application serial no. 2017-152202, filed on Aug. 7, 2017. The entirety of the above-mentioned patent application is hereby incorporated by reference herein and made a part of this specification.

BACKGROUND

Technical Field

The disclosure relates to a tire and, specifically, to a tire suitable for traveling on a snowy road.

Description of Related Art

For example, tires intended for traveling on a snowy road have been proposed. In a tread portion of this type of tire, for example, lug grooves extending in a tire axial direction are formed. The lug grooves enhance traveling performance on a snowy road (hereinafter sometimes simply referred to as "snowy road performance") by causing the snow to be pressed down and sheared.

In order to further enhance the snowy road performance, for example, it is conceivable to increase a groove volume in each of the lug grooves. However, with such a method, for example, there are problems in that the pattern rigidity of land portions decreases and the steering stability performance on a dry road surface deteriorates.

[Patent Document 1] Japanese Unexamined Patent Application, First Publication No 2017-87861

The disclosure has been made in consideration of the above circumstances and provides a tire of which the performance on a snowy road is able to be enhanced while steering stability performance on a dry road surface is maintained.

SUMMARY

The disclosure provides a tire including a tread portion which has a first main groove and a second main groove which extend continuously in a tire circumferential direction, and a first land portion partitioning the first main groove from the second main groove, in which a first lug groove and a first sipe are provided in the first land portion, the first lug groove has one end communicating with the first main groove and another end terminating in the first land portion, the first sipe has one end communicating with the second main groove and another end communicating with the another end of the first lug groove, and the first sipe has a steeply inclined portion extending from the another end of the first lug groove and having an angle with respect to the tire circumferential direction smaller than that of the first lug groove, and a gently inclined portion extending from the steeply inclined portion to the second main groove and having an angle with respect to the tire circumferential direction larger than that of the steeply inclined portion.

In the tire according to an embodiment of the invention, the tread portion preferably includes an outer tread end and an inner tread end which are respectively positioned on an outer side of and inside a vehicle when being attached to the vehicle, and the second main groove is preferably provided on the outer tread end side with respect to the first main groove.

In the tire according to an embodiment of the invention, a length in the tire circumferential direction of the steeply inclined portion is preferably larger than a maximum width in a tire axial direction of the first land portion.

In the tire according to an embodiment of the invention, the steeply inclined portion and the first lug groove are preferably inclined in the same direction with respect to the tire axial direction.

In the tire according to an embodiment of the invention, a second lug groove including one end communicating with the second main groove and another end terminating in the first land portion is preferably provided in the first land portion, and the second lug groove and the steeply inclined portion are preferably formed at positions superimposed on each other when viewed in the tire axial direction.

In the tire according to an embodiment of the invention, the first land portion preferably includes a pair of first land portion edges extending along the first main groove and the second main groove, and each of the first land portion edges preferably includes a convex portion protruding toward an outer side of the first land portion and a concave portion recessed toward an inner side of the first land portion which are alternately provided in the tire circumferential direction.

In the tire according to an embodiment of the invention, a pair of second sipes extending from opposite ends in the tire circumferential direction of the concave portion facing the first main groove are preferably provided in the first land portion.

In the tire according to an embodiment of the invention, it is preferable that a second land portion adjacent to the first land portion with the first main groove interposed therebetween is provided in the tread portion, the second land portion includes a second inner land portion edge extending along the first main groove, the second inner land portion edge includes a second inner convex portion protruding toward an outer side of the second land portion and a second inner concave portion recessed toward an inner side of the second land portion which are alternately provided in the tire circumferential direction, and the second inner concave portion and the convex portion facing the first main groove are formed at positions superimposed on each other when viewed in the tire axial direction.

In the tire of the disclosure, by causing the first sipe having a specific shape to communicate with the first lug groove, an opening/closing change in the first lug groove at the time of being in contact with the ground/not in contact with the ground can be increased. That is, the first lug groove causes the density of the snow pressed down therein to increase when traveling on a snowy road and thus a harder snow column can be formed. Therefore, the first lug groove can generate a larger snow column shearing force, and ultimately traction (or braking force) on a snowy road can be further enhanced. In addition, since the first sipe has a steeply inclined portion, extensive opening of the first sipe can be inhibited even when receiving a lateral force and ultimately deterioration in steering stability on a dry road surface can be inhibited.

DESCRIPTION OF THE EMBODIMENTS

Figure 1:
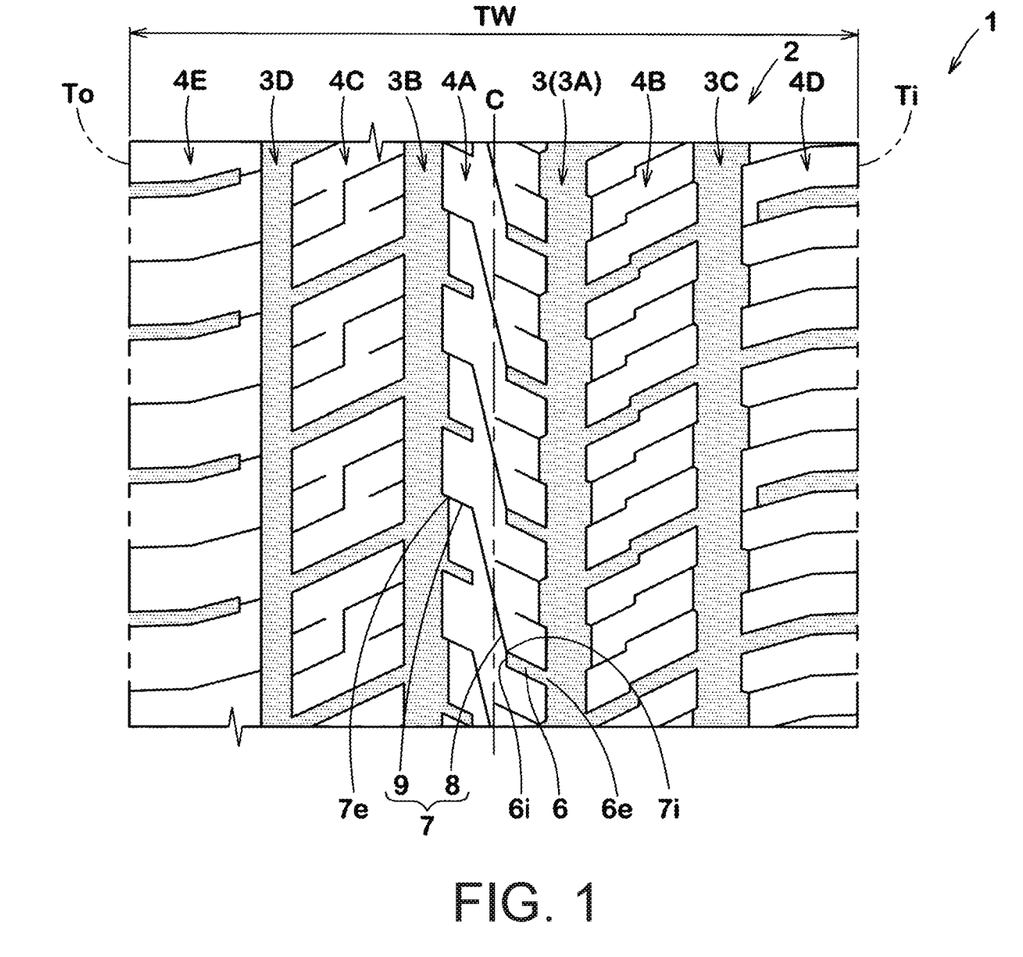
FIG. 1 is a planar figure of a tread portion of a tire according to one embodiment of the disclosure.

Hereinafter, one embodiment of the invention will be described on the basis of the drawings. FIG. 1 is a planar figure of a tread portion 2 of a tire 1 illustrating one embodiment of the invention. In the present embodiment, as a preferred aspect, an all season tire for a four-wheel drive vehicle is illustrated. The disclosure can be applied not only to pneumatic tires for passenger cars or heavy loads, but also to non-pneumatic tires.

The tire 1 of the present embodiment includes an asymmetric tread portion 2 in which a direction of attachment to a vehicle is defined. The tread portion 2 includes an inner tread end Ti positioned on a vehicle inner side when being attached to the vehicle and an outer tread end To positioned on a vehicle outer side when being attached to the vehicle.

The inner tread end Ti and the outer tread end To are respectively defined as ground contact positions on both of the outermost sides in a tire axial direction when a normal state tire on which a normal load is loaded is in contact with the ground on a plane at a camber angle of 0 degrees. In the normal state, a distance in the tire axial direction between the inner tread end Ti and the outer tread end To is defined as a tread width TW. Unless otherwise specified, dimensions of each portion of the tire 1 are values measured in the normal state.

The "normal state" refers to a state in which the tire 1 is rim-assembled onto a normal rim, filled to a normal internal pressure, and is in a state of having no load thereon.

The "normal rim" is defined by standards established for each tire in standard systems including a standard on which the tire 1 is based, for example, the "Standard Rim" of the Japan Automobile Tyre Manufacturers Association (JATMA), the "Design Rim" of the Tire and Rim Association (TRA), or the "Measuring Rim" of the European Tyre and Rim Technical Organization (ETRTO).

The "normal internal pressure" is an air pressure defined by standards established for each tire size in standard systems including a standard on which the tire 1 is based, for example, the "maximum air pressure" of the JATMA, a maximum value described in the table "TIRE LOAD LIMITS AT VARIOUS COLD INFLATION PRESSURES" of the TRA, or the "INFLATION PRESSURE" of the ETRTO.

The "normal load" is a load defined by standards established for each tire size in standard systems including a standard on which the tire 1 is based, for example, the "maximum load capacity" of the JATMA, a maximum value described in the table "TIRE LOAD LIMITS AT VARIOUS COLD INFLATION PRESSURES" of the TRA, or the "LOAD CAPACITY" of the ETRTO.

As illustrated in FIG. 1, in the tire 1 of the present embodiment, a plurality of main grooves 3 extending continuously in a tire circumferential direction are formed on the tread portion 2.

In the present embodiment, the main grooves 3 includes a first main groove 3A to a fourth main groove 3D. In the present embodiment, the first main groove 3A is disposed on the inner tread end Ti side with respect to a tire equator C.

In the present embodiment, the second main groove 3B is disposed on the outer tread end To side with respect to the tire equator C. In the present embodiment, the third main groove 3C is disposed between the first main groove 3A and the inner tread end Ti. The fourth main groove 3D is disposed between the second main groove 3B and the outer tread end To. Further, the main grooves 3 are not limited to such an aspect, and may adopt aspects of various types.

Due to such main grooves 3, a first land portion 4A to a fifth land portion 4E are formed in the tread portion 2 of the present embodiment. In the present embodiment, the first land portion 4A partitions the first main groove 3A from the second main groove 3B, and forms a crown region on the tire equator C. In the present embodiment, the second land portion 4B partitions the first main groove 3A from the third main groove 3C, and forms a middle region on the inner tread end Ti side. In the present embodiment, the third land portion 4C partitions the second main groove 3B from the fourth main groove 3D, and forms a middle region on the outer tread end To side. In the present embodiment, the fourth land portion 4D partitions the third main groove 3C from the inner tread end Ti to form a shoulder region. In the present embodiment, the fifth land portion 4E partitions the fourth main groove 3D from the outer tread end To to form a shoulder region.

In the first land portion 4A of the present embodiment, a plurality of first lug grooves 6 and a plurality of first sipes 7 are respectively provided. In this specification, grooves including the lug grooves, lateral grooves to be described below, and main grooves are a grooved constitution having a groove width exceeding 1.0 mm, and sipes are defined as slits having a width of 1.00 mm or less.

Both of the first lug grooves 6 and the first sipes 7 of the present embodiment are consecutively inclined in the same direction with respect to the tire axial direction (upward to the left in the drawing).

In the present embodiment, each of the first lug grooves 6 includes one end 6e communicating with the first main groove 3A and another end 6i terminating in the first land portion 4A. Each of the first sipes 7 includes one end 7e communicating with the second main groove 3B and another end 7i communicating with another end 6i of the first lug groove 6. As described above, in the present embodiment, the first sipe 7 communicates with the first lug groove 6 so that the first lug groove 6 and the first sipe 7 traverse the first land portion 4A. Thereby, an opening/closing change in the first lug groove 6 at the time of being in contact with the ground/not in contact with the ground can be increased. That is, the first lug groove 6, causes the density of the snow pressed down therein to increase when traveling on a snowy road and thus a harder snow column can be formed. Therefore, the first lug groove 6 generates a larger snow column shearing force, and thus can enhance traction (or braking force) on a snowy road.

In the present embodiment, the first sipe 7 includes a steeply inclined portion 8 and a gently inclined portion 9. The steeply inclined portion 8 of the present embodiment extends from another end 6i of the first lug groove 6 and is formed to have an angle with respect to the tire circumferential direction smaller than that of the first lug groove 6. The gently inclined portion 9 of the present embodiment extends from the steeply inclined portion 8 to the second main groove 3B and is formed to have an angle with respect to the tire circumferential direction larger than that of the steeply inclined portion 8. Such a steeply inclined portion 8, for example, inhibits extensive opening of the first sipe 7 even when the first land portion 4A receives a lateral force, and ultimately can also inhibit deterioration in steering stability on a dry road surface.

In the present embodiment, the first land portion 4A forms the crown region on the tire equator C. The first land portion 4A as described above is a land portion that affects the behavior of the vehicle at an initial stage of turning when a steering wheel of the vehicle begins to be turned. In this first land portion 4A, in this embodiment, no lateral grooves traversing the land portion are formed, and thus a high rigidity of the land portion is maintained. Therefore, smooth behavior of the vehicle at the initial stage of turning is secured, and thereby an excellent steering stability performance is maintained. Further, since the steeply inclined portion 8 and the gently inclined portion 9 have different opening/closing directions, extensive opening of the first sipe 7 is inhibited, and thereby yet smoother behavior for the vehicle at an initial stage of turning is secured.

Figure 2:
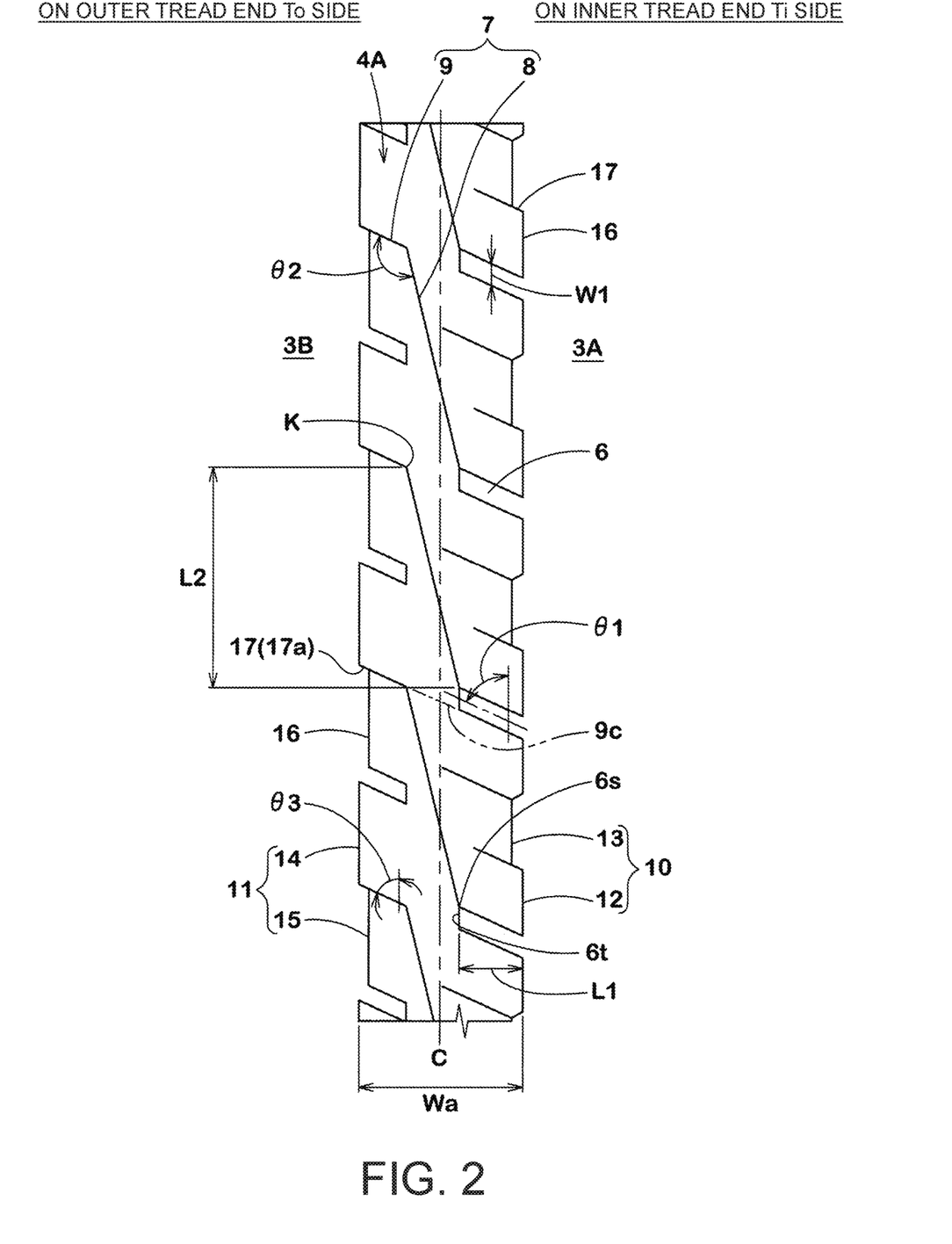
FIG. 2 is an enlarged view of a first land portion of FIG. 1.

FIG. 2 is an enlarged view of the first land portion 4A. As illustrated in FIG. 2, the first lug groove 6 extends linearly in the present embodiment. Since such a first lug groove 6 exhibits a large shearing force in response to snow columns, traction on a snowy road is enhanced.

In the present embodiment, the first lug groove 6 is inclined to one side with respect to the tire axial direction. Since such a first lug groove 6 also has an edge component in the tire circumferential direction, turning performance on a snowy road is enhanced. An angle $\theta 1$ of the first lug groove 6 with respect to the tire circumferential direction is preferably 50 to 80 degrees.

A length L1 of the first lug groove 6 in the tire axial direction is preferably 20% to 50% of a maximum width Wa of the first land portion 4A. When the length L1 of the first lug groove 6 in the tire axial direction is less than 20% of the maximum width Wa of the first land portion 4A, snow columns become small and snowy road performance may deteriorate. When the length L1 of the first lug groove 6 in the tire axial direction exceeds 50% of the maximum width Wa of the first land portion 4A, the rigidity of the first land portion 4A decreases and the steering stability performance on a dry road surface may deteriorate.

In order for the above-described behavior to be effectively exhibited, a groove width W1 of the first lug groove 6 in the tire circumferential direction is preferably 3 to 5 mm. Although not particularly limited, a groove depth (not illustrated) of the first lug groove 6 is preferably 50% to 90% of a groove depth (not illustrated) of the first main groove 3A.

In the present embodiment, each of the steeply inclined portion 8 and the gently inclined portion 9 extends linearly. Since the steeply inclined portion 8 and the gently inclined portion 9 inhibit excessive deterioration in rigidity of the first land portion 4A, an excellent steering stability performance on a dry road surface is maintained.

The steeply inclined portion 8 and the gently inclined portion 9 are inclined in the same direction with respect to the tire circumferential direction. Since such a first sipe 7 inhibits deterioration in rigidity at an intersecting position K between the steeply inclined portion 8 and the gently inclined portion 9, the above-described behavior is more effectively exhibited. An angle $\theta 2$ between the steeply inclined portion 8 and the gently inclined portion 9 is preferably 115 to 135 degrees.

A length L2 in the tire circumferential direction of the steeply inclined portion 8 is preferably larger than the maximum width Wa of the first land portion 4A. Such a steeply inclined portion 8 can more effectively inhibits the extensive opening of the first sipe 7 even when receiving a lateral force. Further, the steeply inclined portion 8 of the present embodiment has a large edge component in the tire circumferential direction, and thus the turning performance on a snowy road, especially on a pressed-down snowy road is enhanced. The length L2 of the steeply inclined portion 8 is more preferably 1.1 to 1.4 times the maximum width Wa of the first land portion 4A.

In a groove edge 6t extending in the tire circumferential direction of the first lug groove 6, the steeply inclined portion 8 communicates with one end 6s (one end on an upper side in the drawing) in the tire circumferential direction at which stress concentration tends to occur. Thereby, since the opening/closing change in the first lug groove 6 at the time of being in contact with the ground/not in contact with the ground can become even larger, an even larger snow column shearing force can be generated.

Since the angle $\theta 3$ with respect to the tire circumferential direction is large, the gently inclined portion 9 inhibits an excessive deterioration in rigidity of the land portion on the second main groove 3B side of the first land portion 4A and allows steering stability performance on a dry road surface, especially, smooth behavior at an initial stage of turning to be maintained. In order for such a behavior to be effectively exhibited, the angle $\theta 3$ of the gently inclined portion 9 is preferably 50 to 80 degrees, and more preferably is the same as the angle $\theta 1$ of the first lug groove 6.

In the present embodiment, a virtual line 9c, which smoothly extends over the gently inclined portion 9 toward the inner tread end Ti side, overlaps a first lug groove 6 adjacent to the first lug groove 6 communicating with the gently inclined portion 9 in the tire circumferential direction. Thereby, the opening/closing change in the first lug groove 6 at the time of being in contact with the ground/not in contact with the ground becomes even larger.

The first land portion 4A includes one first land portion edge 10 extending along the first main groove 3A and another first land portion edge 11 extending along the second main groove 3B.

In the present embodiment, one first land portion edge 10 facing the first main groove 3A includes a convex portion 12 protruding toward an outer side of the first land portion 4A and a concave portion 13 recessed toward an inner side of the first land portion 4A which are alternately arranged in the tire circumferential direction. In the present embodiment, another first land portion edge 11 facing the second main groove 3B includes a convex portion 14 protruding toward an outer side of the first land portion 4A and a concave portion 15 recessed toward an inner side of the first land portion 4A which are alternately arranged in the tire circumferential direction. Since each of these first land portion edges 10 and 11 has an edge component in the tire axial direction, a large snow column shearing force is generated.

In the present embodiment, both the first land portion edges 10 and 11 are formed to include a circumferential direction portion 16 extending in the tire circumferential direction and an axial direction inclined portion 17 having a length smaller than that of the circumferential direction portion 16 and inclined at a larger angle with respect to the tire circumferential direction than the circumferential direction portion 16.

An axial direction inclined portion 17a of another first land portion edge 11 is formed to be smoothly continuous with the gently inclined portion 9. Thereby, an apparent edge component of the gently inclined portion 9 increases and traveling performance on a snowy road is enhanced. The axial direction inclined portion 17a of the present embodiment forms one edge linearly extending along with the gently inclined portion 9.

Figure 3:
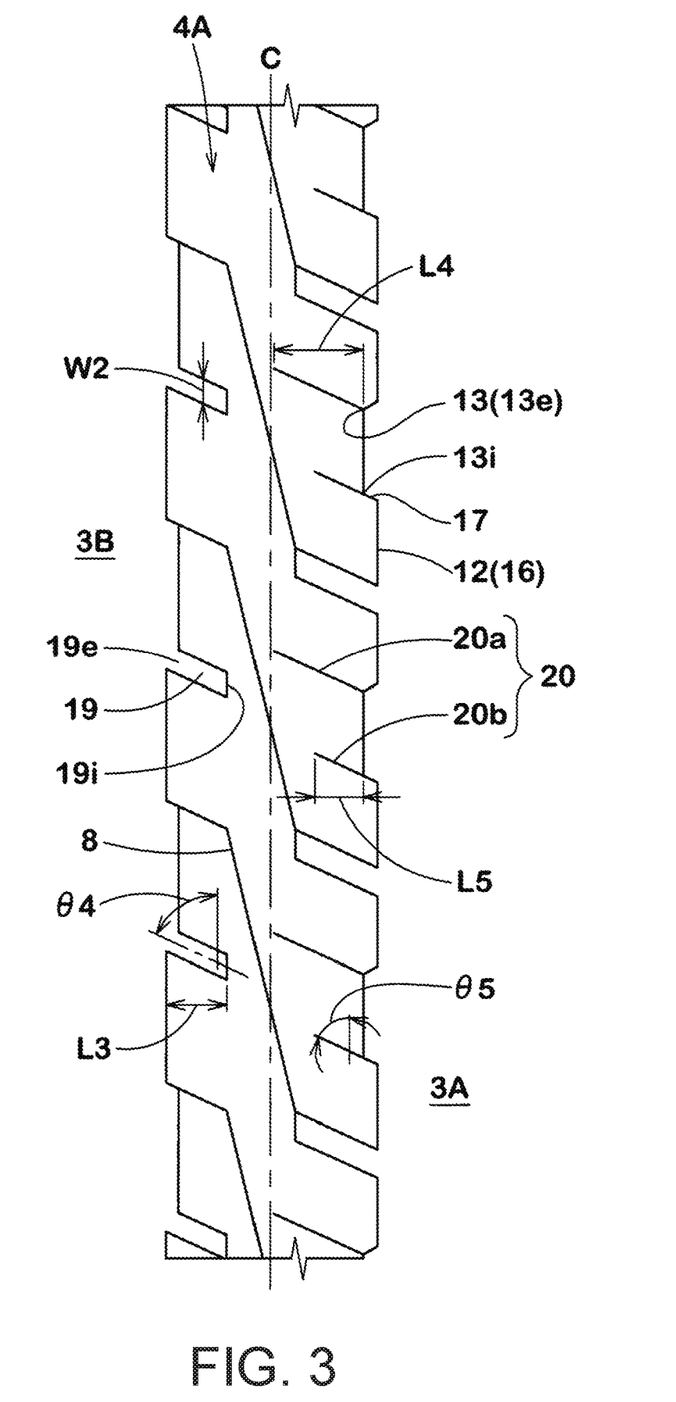
FIG. 3 is an enlarged view of the first land portion of FIG. 1.

As illustrated in FIG. 3, a second lug groove 19 and a second sipe 20 are further provided in the first land portion 4A of the present embodiment. In the present embodiment, both the second lug groove 19 and the second sipe 20 are inclined in the same direction with respect to the tire axial direction (upward to the left in the drawing).

In the present embodiment, one end 19e of the second lug groove 19 communicates with the second main groove 3B and another end 19i thereof terminates in the first land portion 4A. Such a second lug groove 19 also generates a snow column shearing force.

Unlike the first lug groove 6, the second lug groove 19 has no sipes communicating therewith. As described above, in the present embodiment, a sipe communicates with the first lug groove 6 on the inner tread end Ti side and no sipes communicate with the second lug groove 19 on the outer tread end To side. Thereby, since a high rigidity of the land portion on the outer tread end To side on which a relatively large lateral force acts is secured, an excellent steering stability performance on a dry road surface is maintained.

From the perspective of securing a high rigidity of the land portion on the outer tread end To side of the first land portion 4A, an angle $\theta 4$ of the second lug groove 19 with respect to the tire circumferential direction is preferably 50 to 80 degrees. In the present embodiment, the angle $\theta 4$ of the second lug groove 19 is formed to have the same degree as the angle $\theta 3$ of the gently inclined portion 9.

The second lug groove 19 and the steeply inclined portion 8 are formed at positions superimposed on each other when viewed in the tire axial direction. Thereby, by utilizing opening of the first sipe 7, an opening/closing change in the second lug groove 19 at the time of being in contact with the ground/not in contact with the ground can be enhanced. In order to inhibits the extensive opening of the first sipe 7 while the above-described behavior is effectively exhibited, the second lug groove 19 is preferably provided at an intermediate position between gently inclined portions 9 and 9 adjacent to each other in the tire circumferential direction.

Although not particularly limited, a length L3 of the second lug groove 19 in the tire axial direction is preferably 10% to 25% of the maximum width Wa of the first land portion 4A. Also, a groove width W2 in the tire circumferential direction of the second lug groove 19 is preferably 5% to 17% of the maximum width Wa of the first land portion 4A. A depth (not illustrated) of the second lug groove 19 is preferably 50% to 90% of a groove depth (not illustrated) of the second main groove 3B.

In the present embodiment, the second sipes 20 include a second long sipe 20a and a second short sipe 20b having a smaller length in the tire axial direction than the second long sipe 20a. The second long sipe 20a extends from one end (upper end in the drawing) 13e in the tire circumferential direction of the concave portion 13 facing the first main groove 3A and terminates in the first land portion 4A without communicating with the steeply inclined portion 8. The second short sipe 20b extends from another end (lower end in the drawing) 13i in the tire circumferential direction of the concave portion 13 facing the first main groove 3A and terminates in the first land portion 4A without communicating with the steeply inclined portion 8. Such a second sipe 20 can cause the opening/closing change in the first lug groove 6 to become even larger.

The second short sipe 20b on a side of another end 13i of the present embodiment is smoothly continuous with the axial direction inclined portion 17 intersecting the circumferential direction portion 16 constituting the convex portion 12. In the present embodiment, the second short sipe 20b forms one edge extending smoothly along with the axial direction inclined portion 17. Thereby, an apparent edge component of the second short sipe 20b increases and stable traveling performance on a snowy road is enhanced.

In order to maintain the rigidity of the first land portion 4A high, an angle $\theta 5$ of the second sipe 20 with respect to the tire circumferential direction is preferably, for example, 50 to 80 degrees, and more preferably is the same as the angle $\theta 1$ of the first lug groove 6.

Although not particularly limited, a length L4 in the tire axial direction of the second long sipe 20a is preferably larger than the length L1 in the tire axial direction of the first lug groove 6. Also, a length L5 in the tire axial direction of the second short sipe 20b is preferably smaller than the length L1 in the tire axial direction of the first lug groove 6.

A depth (not illustrated) of the first sipe 7 is preferably, for example, 20% to 40% of the groove depth of the first main groove 3A. Also, a depth (not illustrated) of the second sipe 20 is preferably, for example, 50% to 90% of the groove depth of the first main groove 3A.

Figure 4:
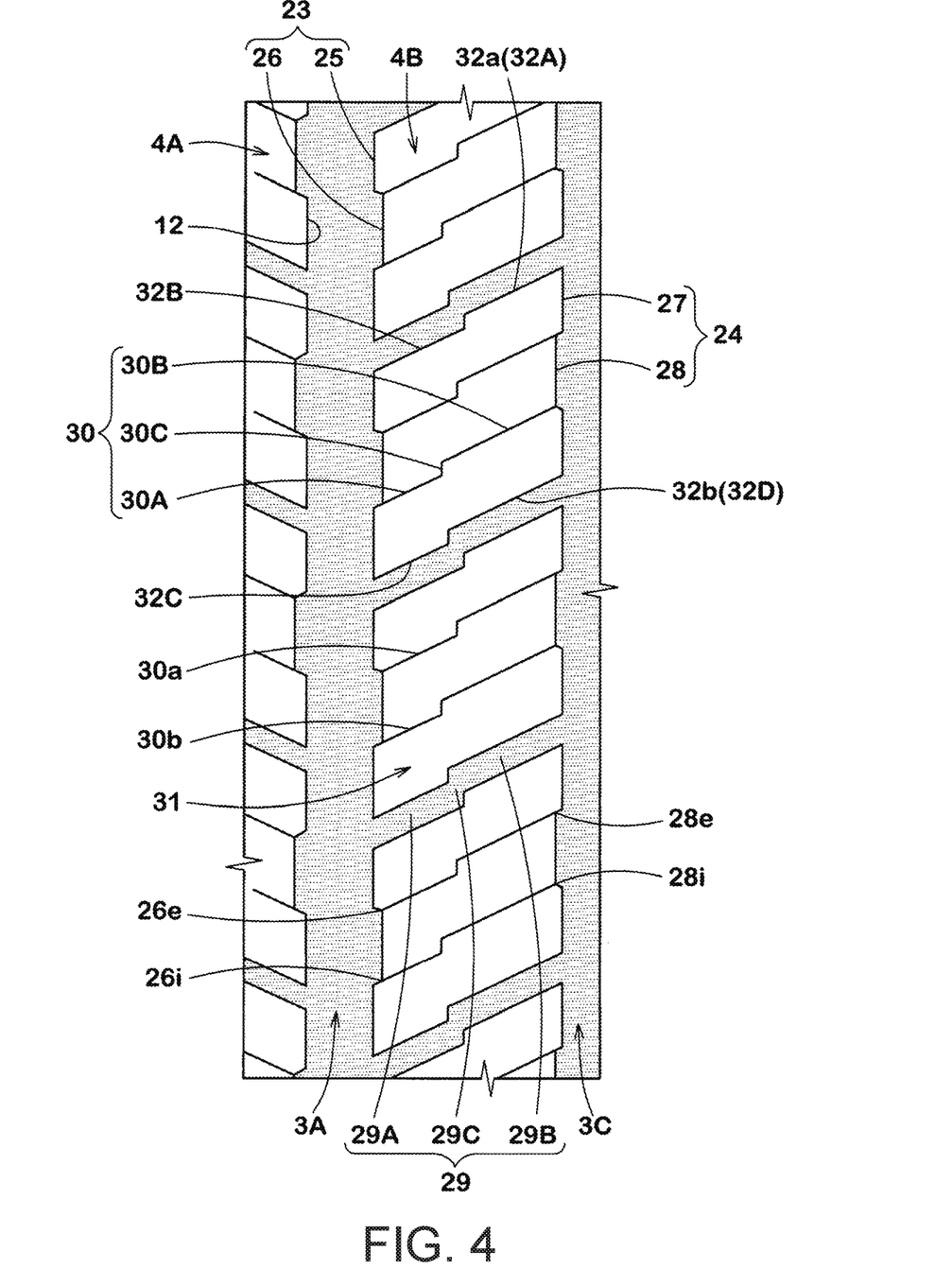
FIG. 4 is an enlarged view of a second land portion of FIG. 1.

As illustrated in FIG. 4, the second land portion 4B includes a second inner land portion edge 23 extending along the first main groove 3A and a second outer land portion edge 24 extending along the third main groove 3C.

The second inner land portion edge 23 of the present embodiment includes a second inner convex portion 25 protruding toward an outer side of the second land portion 4B and a second inner concave portion 26 recessed toward an inner side of the second land portion 4B which are alternately arranged in the tire circumferential direction. The second outer land portion edge 24 of the present embodiment includes a second outer convex portion 27 protruding toward an outer side of the second land portion 4B and a second outer concave portion 28 recessed toward an inner side of the second land portion 4B which are alternately arranged in the tire circumferential direction. Since such a second land portion 4B has an edge component in the tire axial direction, the snowy road performance is enhanced.

When viewed in the tire axial direction, the second inner concave portion 26 and the convex portion 12 facing the first main groove 3A are formed at positions superimposed on each other. Such a second inner concave portion 26 causes an edge component in the tire axial direction at a position in the tire circumferential direction in which the second inner concave portion 26 is formed to become larger while the groove width of the first main groove 3A is secured, and thereby traction on a snowy road is enhanced.

The second land portion 4B includes a plurality of second lateral grooves 29 connecting the first main groove 3A to the third main groove 3C, and a plurality of second land portion sipes 30 connecting the first main groove 3A to the third main groove 3C. Both the second lateral grooves 29 and the second land portion sipes 30 of the present embodiment are inclined in the same direction with respect to the tire axial direction (upward to the right in the drawing). The second lateral grooves 29 and the second land portion sipes 30 as described above can inhibit deterioration in rigidity in the tire circumferential direction of the second land portion 4B and inhibit deterioration in steering stability performance on a dry road surface.

In the second land portion 4B, second blocks 31 partitioned by the second lateral grooves 29 and 29 spaced apart in the tire circumferential direction are arranged in the tire circumferential direction.

Each of the second blocks 31 includes a pair of lateral block edges 32a and 32b extending in the tire axial direction on both sides in the tire circumferential direction. One lateral block edge 32a (upper side in the drawing) of the present embodiment includes a first circumferential direction convex portion 32A protruding toward an outer side of the second block 31 and a first circumferential direction concave portion 32B recessed toward an inner side of the second block 31. Another lateral block edge 32b (lower side in the drawing) of the present embodiment includes a second circumferential direction convex portion 32C protruding toward an outer side of the second block 31 and a second circumferential direction concave portion 32D recessed toward an inner side of the second block 31. Since such a second block 31 has a large edge component in the tire circumferential direction, excellent snowy road performance is exhibited.

For example, each of the second lateral grooves 29 includes a first portion 29A communicating with the first main groove 3A and extending linearly, a second portion 29B communicating with the third main groove 3C and extending linearly, and a third portion 29C connecting the first portion 29A to the second portion 29B and extending at a small angle with respect to the tire circumferential direction.

Each of the second land portion sipes 30 includes a first sipe portion 30A linearly extending from the first main groove 3A, a second sipe portion 30B linearly extending from the third main groove 3C, and a third sipe portion 30C connecting the first sipe portion 30A to the second sipe portion 30B and extending in the tire circumferential direction.

The first sipe portion 30A of the present embodiment extends along the first circumferential direction concave portion 32B and the second circumferential direction convex portion 32C. The second sipe portion 30B of the present embodiment extends along the first circumferential direction convex portion 32A and the second circumferential direction concave portion 32D. Thereby, a high rigidity of the second block 31 in the tire circumferential direction is maintained.

Two second land portion sipes 30 are provided in the second block 31. In the present embodiment, one second land portion sipe 30a (upper side in the drawing) connects one end 26e (upper side in the drawing) in the tire circumferential direction of the second inner concave portion 26 to one end 28e in the tire circumferential direction of the second outer concave portion 28. In the present embodiment, another second land portion sipe 30b (lower side in the drawing) connects another end 26i (lower side in the drawing) in the tire circumferential direction of the second inner concave portion 26 to another end 28i in the tire circumferential direction of the second outer concave portion 28. As described above, the second land portion sipe 30 connecting between concave portions can increase an opening/closing change in the second lateral groove 29.

The third sipe portion 30C of one second land portion sipe 30a and the third sipe portion 30C of another second land portion sipe 30b are positionally deviated in the tire axial direction. Thereby, excessive deterioration in rigidity of the second block 31 is inhibited.

Figure 5:
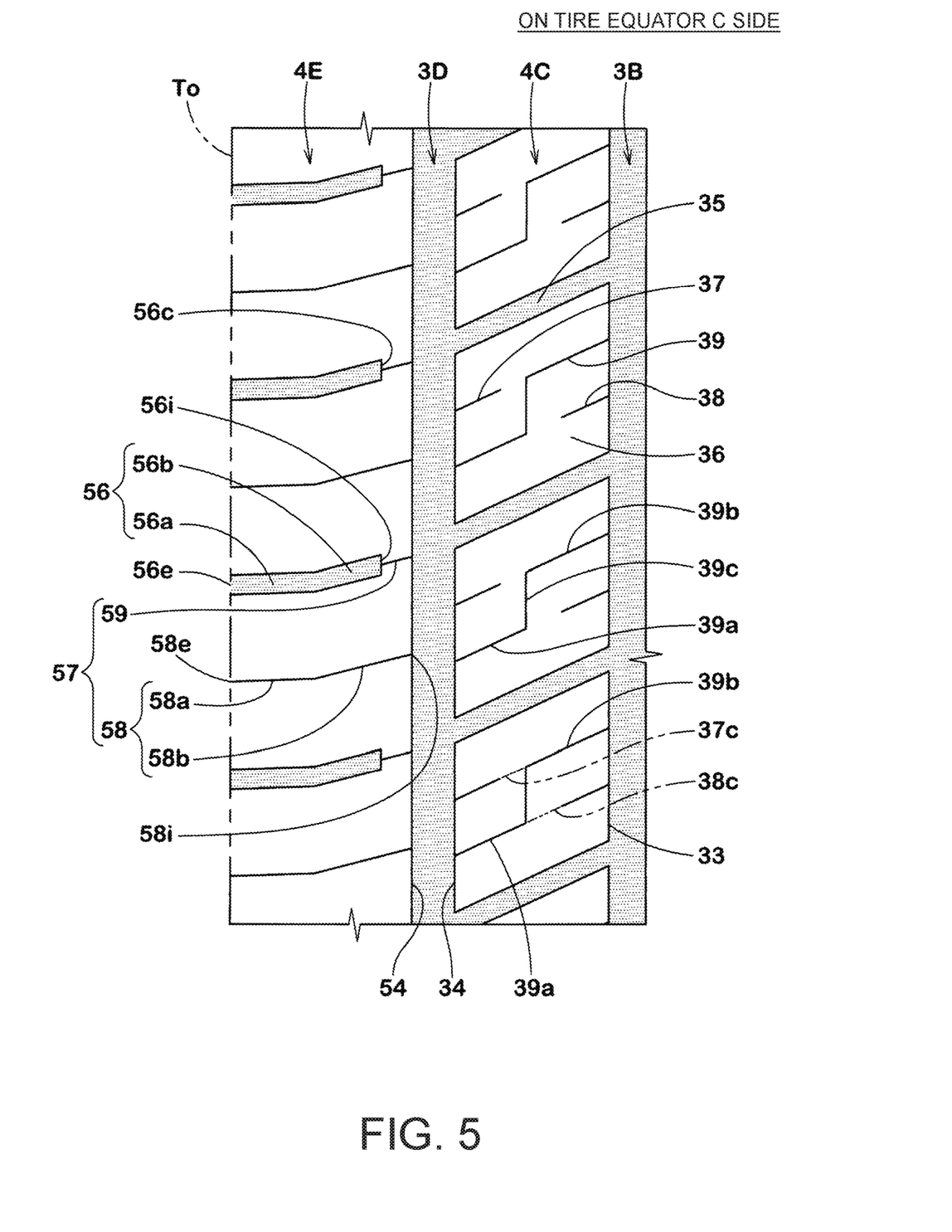
FIG. 5 is an enlarged view of an outer tread end side of FIG. 1.

As illustrated in FIG. 5, the third land portion 4C includes a third inner land portion edge 33 extending along the second main groove 3B and a third outer land portion edge 34 extending along the fourth main groove 3D. The third inner land portion edge 33 and the third outer land portion edge 34 extend linearly in the tire circumferential direction. Thereby, the third land portion 4C has high rigidity in the tire axial direction.

In the present embodiment, the third land portion 4C is partitioned into a plurality of third blocks 36 by a plurality of third lateral grooves 35 connecting the second main groove 3B to the fourth main groove 3D.

The third lateral grooves 35 are inclined toward one side (upward to the right in the drawing) with respect to the tire axial direction and extend linearly. Such third lateral grooves 35 also generate a large snow column shearing force.

Each of the third blocks 36 includes a third outer sipe 37, a third inner sipe 38, and a third transverse sipe 39. The third outer sipe 37 of the present embodiment extends linearly from the fourth main groove 3D and terminates in the third block 36. The third inner sipe 38 of the present embodiment extends linearly from the second main groove 3B and terminates in the third block 36. The third transverse sipe 39 of the present embodiment allows communication between the second main groove 3B and the fourth main groove 3D.

All of the third outer sipe 37, the third inner sipe 38, and the third transverse sipe 39 of the present embodiment are inclined toward one side with respect to the tire axial direction of the tire (upward to the right in the drawing).

The third transverse sipe 39 includes an outer portion 39a extending linearly along the third outer sipe 37, an inner portion 39b extending linearly along the third inner sipe 38, and a central portion 39c connecting the outer portion 39a to the inner portion 39b and extending in the tire circumferential direction. The third transverse sipe 39 as described above inhibits deterioration in rigidity in the tire circumferential direction of the third block 36.

The outer portion 39a of the present embodiment is continuous with a virtual line 38c on which the third inner sipe 38 smoothly extends toward an outer side in the tire axial direction. In the present embodiment, the outer portion 39a coincides with the virtual line 38c. The outer portion 39a forms one smooth virtual sipe together with the third inner sipe 38 and exhibits a large frictional force and an effect of maintaining the third block 36 highly resistant. The inner portion 39b of the present embodiment is continuous with a virtual line 37c on which the third outer sipe 37 smoothly extends toward an inner side in the tire axial direction. In the present embodiment, the inner portion 39b coincides with the virtual line 37c. Such an inner portion 39b forms one smooth virtual sipe together with the third outer sipe 37 and exhibit the same effects.

Figure 6:
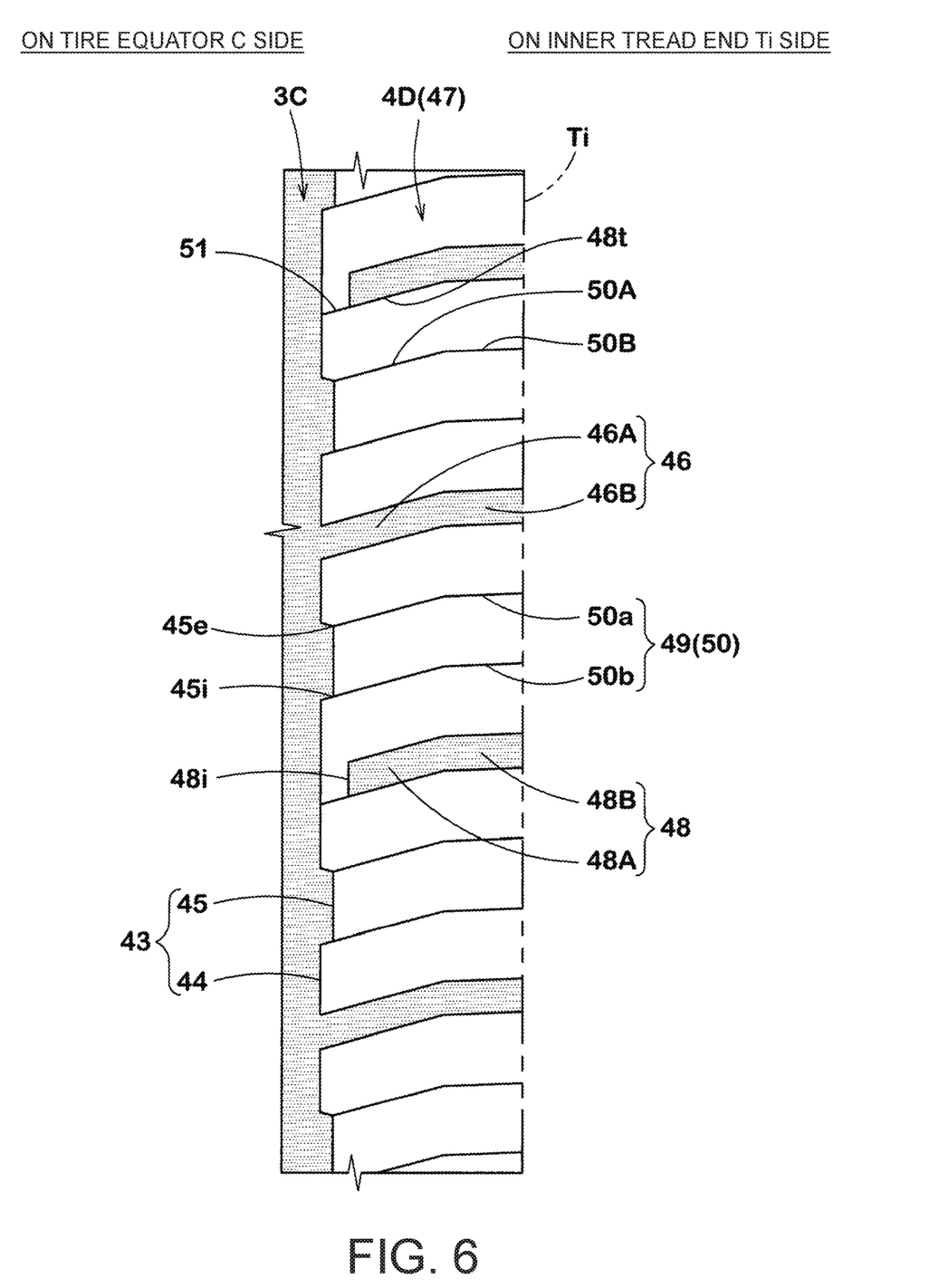
FIG. 6 is an enlarged view of a fourth land portion of FIG. 1.

As illustrated in FIG. 6, the fourth land portion 4D includes a fourth land portion edge 43 extending along the third main groove 3C. The fourth land portion edge 43 includes a fourth convex portion 44 protruding toward an outer side of the fourth land portion 4D and a fourth concave portion 45 recessed toward an inner side of the fourth land portion 4D which are alternately arranged in the tire circumferential direction.

A plurality of fourth lateral grooves 46 which connect the third main groove 3C to the inner tread end Ti are provided in the fourth land portion 4D. Thereby, in the fourth land portion 4D of the present embodiment, fourth blocks 47 partitioned by the fourth lateral grooves 46 are arranged in the tire circumferential direction.

Each of the fourth lateral grooves 46 includes a fourth inclined portion 46A communicating with the third main groove 3C and inclined with respect to the tire axial direction, and a fourth small inclined portion 46B continuous with the fourth inclined portion 46A and inclined at a smaller angle with respect to the tire axial direction than the fourth inclined portion 46A. Such a fourth lateral groove 46 enhances rigidity in the tire axial direction of the fourth land portion 4D on the inner tread end Ti side on which a relatively large lateral force acts and thus inhibits deterioration in steering stability performance on a dry road surface.

A fourth lug groove 48 and a fourth sipe 49 are provided in the fourth block 47. Both of the fourth lug groove 48 and the fourth sipe 49 of the present embodiment are consecutively inclined (upward to the right in the drawing) in the same direction with respect to the tire axial direction.

The fourth lug groove 48 includes a fourth inner lug groove portion 48A and a fourth outer lug groove portion 48B. The fourth inner lug groove portion 48A of the present embodiment includes an inner end 48i in the fourth block 47 and extends linearly from the inner end 48i toward an outer side in the tire axial direction. The fourth outer lug groove portion 48B of the present embodiment is continuous with the fourth inner lug groove portion 48A and is inclined at a smaller angle with respect to the tire axial direction than the fourth inner lug groove portion 48A.

In the present embodiment, the fourth inner lug groove portion 48A extends along the fourth inclined portion 46A. In the present embodiment, the fourth outer lug groove portion 48B extends along the fourth small inclined portion 46B. The fourth lug groove 48 as described above in cooperation with the fourth lateral groove 46 increases an opening/closing change in the grooves and enhances a snow column shearing force.

The fourth sipe 49 includes a fourth transverse sipe 50 which connects the inner tread end Ti to the third main groove 3C, and a fourth inner sipe 51 which allows communication between an inner end 48i of the fourth lug groove 48 and the third main groove 3C.

In the present embodiment, the fourth transverse sipe 50 is formed by two fourth transverse sipes 50a and 50b extending from one end (upper end in the drawing) 45e in the tire circumferential direction of the fourth concave portion 45 of the fourth land portion edge 43 and another end (lower end in the drawing) 45i in the tire circumferential direction of the fourth concave portion 45.

In the present embodiment, the fourth transverse sipe 50 includes a fourth inner portion 50A extending along the fourth inclined portion 46A and a fourth outer portion 50B extending along the fourth small inclined portion 46B. In the present embodiment, the fourth inner portion 50A is inclined toward one side with respect to the tire axial direction from the third main groove 3C to the inner tread end Ti side. In the present embodiment, the fourth outer portion 50B connects the fourth inner portion 50A to the inner tread end Ti and is inclined at an angle with respect to the tire axial direction smaller than that of the fourth inner portion 50A.

The fourth inner sipe 51 extends along the fourth inclined portion 46A and is smoothly continuous with the fourth inner lug groove portion 48A. The fourth inner sipe 51 of the present embodiment is smoothly continuous with one groove edge 48t (lower side in the drawing) extending in the tire axial direction of the fourth lug groove 48. Such a fourth inner sipe 51 can increase an opening/closing change in the fourth lug groove 48.

As illustrated in FIG. 5, the fifth land portion 4E includes a fifth land portion edge 54 extending along the fourth main groove 3D. The fifth land portion edge 54 extends linearly in the tire circumferential direction.

As described above, in the present embodiment, concavities and convexities are alternately formed on the land portion edges 10 and 11 of the first land portion 4A forming the crown region, the land portion edges 23 and 24 of the second land portion 4B on the inner tread end Ti side, and the land portion edge 43 of the land portion 4D. In addition, the land portion edges 33 and 34 of the third land portion 4C on the outer tread end To side and the land portion edge 54 of the fifth land portion 4E are formed in a straight line. Accordingly, a high rigidity in the tire axial direction of the third land portion 4C and the fifth land portion 4E, on which a relatively large lateral force tends to be generated, is maintained. Further, in the first land portion 4A, the second land portion 4B, and the fourth land portion 4D in which relatively small lateral force is generated, an edge component in the tire axial direction is enlarged such that traction or a braking force on a snowy road is enhanced. Thereby, the snowy road performance is enhanced while steering stability performance on a dry road surface is maintained.

A fifth lug groove 56 and a fifth sipe 57 are provided in the fifth land portion 4E. Both the fifth lug groove 56 and the fifth sipe 57 of the present embodiment are consecutively inclined (upward to the right in the drawing) in the same direction with respect to the tire axial direction.

In the fifth lug groove 56 of the present embodiment, one end 56e communicates with the outer tread end To and another end 56i terminates in the fifth land portion 4E. The fifth lug groove 56 includes a fifth outer lug groove portion 56a linearly extending from the outer tread end To and a fifth inner lug groove portion 56b communicating with the fifth outer lug groove portion 56a and linearly extending and inclined at an angle with respect to the tire axial direction larger than that of the fifth outer lug groove portion 56a.

The fifth sipe 57 includes a fifth transverse sipe 58 in which one end 58e communicates with the outer tread end To and another end 58i communicates with the fourth main groove 3D and a fifth outer sipe 59 which allows communication between another end 56i of the fifth lug groove 56 and the fourth main groove 3D.

The fifth transverse sipe 58 includes a fifth outer portion 58a extending along the fifth outer lug groove portion 56a and a fifth inner portion 58b continuous with the fifth outer portion 58a and extending along the fifth inner lug groove portion 56b. In the present embodiment, the fifth outer portion 58a extends from the outer tread end To to the tire equator C side and linearly extends to be inclined to one side with respect to the tire axial direction. In the present embodiment, the fifth inner portion 58b linearly extends to be inclined at an angle with respect to the tire axial direction larger than that of the fifth outer portion 58a.

The fifth outer sipe 59 smoothly communicates with the fifth inner lug groove portion 56b. The fifth transverse sipe 58 and the fifth outer sipe 59 cause an opening/closing change in the fifth lug groove 56 to increase and generate a high snow column shearing force.

In the present embodiment, the fifth outer sipe 59 continues to an intermediate position in the tire circumferential direction of a groove edge 56c extending in the tire circumferential direction of the fifth inner lug groove portion 56b. Such a fifth outer sipe 59 inhibits an excessive deterioration in rigidity of the land portion of the fifth land portion 4E, and thus maintains the steering stability performance on a dry road surface.

As illustrated in FIG. 1, in the present embodiment, a direction of inclination of each of the lug grooves 6 and 19, and each of the sipes 7 and 20, of the first land portion 4A with respect to the tire axial direction is formed in a direction opposite to a direction of inclination of each of the lateral grooves 29, 35, and 46, each of the lug grooves 48 and 56, and each of the sipes 30, 37, 38, 39, 49, and 57, of the second land portion 4B to the fifth land portion 4E with respect to the tire axial direction. Thereby, forces in a lateral direction acting on each of the lug grooves 6 and 19, and each of the sipes 7 and 20, of the first land portion 4A, and acting on each of the lateral grooves 29, 35, and 46, each of the lug grooves 48 and 56, and each of the sipes 30, 37, 38, 39, 49, and 57, of the second land portion 4B to the fifth land portion 4E cancel each other out. Therefore, excellent traveling performance on a snowy road is secured.

While embodiments of the invention have been described above in detail, it goes without saying that the disclosure is not limited to the illustrated embodiments, and can be implemented with various modifications.

Pneumatic tires for a four-wheel drive vehicle having a size 225/65 R 17 with the basic pattern illustrated in FIG. 1 were manufactured as a prototype on the basis of specifications in Table 1, and the snowy road performance of each test tire and the steering stability performance on a dry road surface were tested. The main common specifications and test methods of the test tires were as follows.

Depth of the first lug groove and the second lug groove: 6.6 mm

Depth of the first sipe and the second sipe: 6.6 mm

Depth of the first main groove and the second main groove: 8.2 mm

Angle θ3 of gently inclined portion: 65 degrees

<Steering Stability Performance on Dry Road Surface>

Each test tire was attached to all of the wheels of a four-wheel drive vehicle with a displacement of 2000 cc under the following conditions. Then, a test driver traveled on a dry asphalt road test course. The test driver sensorily evaluated traveling characteristics relating to traction and a braking force at this time, a time lag from an operation of the steering wheel of the vehicle to a start of turning, and the like. The results are shown by scores with that for Comparative example 1 being taken as 100. The larger the numerical value, the better.

Rim: 6.5 J

Internal pressure: 210 kPa

<Snowy Road Performance>

The test driver accelerated the vehicle from a speed of 8 km/h to 32 km/h on a snowy road surface test course, and measured a traveling distance at this time. The results are expressed using an index that uses the reciprocal of the traveling distance and takes the value of Comparative example 1 as 100. The larger the numerical value, the greater the traction generated and the better the snowy road performance. The results of the tests are shown in Table 1.

TABLE 1

| | Comparative example | Example 1 | Example 2 | Example 3 | Example 4 | Example 5 |
|---|---|---|---|---|---|---|
| Presence of first sipe | No | Yes | Yes | Yes | Yes | Yes |
| Length of steeply inclined portion L2/Wa | — | 1.2 | 0.9 | 1.1 | 1.4 | 1.2 |
| Groove width of first lug groove W1 (mm) | 4 | 4 | 4 | 4 | 4 | 3 |
| Length of first lug groove L1/Wa (%) | 35 | 35 | 35 | 35 | 35 | 35 |
| Angle θ2 (degrees) between steeply inclined portion and gently inclined portion | — | 125 | 125 | 125 | 125 | 125 |
| Steering stability performance on dry road surface [score: the higher the numerical value, the better] | 100 | 100 | 100 | 105 | 95 | 105 |
| Snowy road performance [index: the higher the numerical value, the better] | 100 | 120 | 110 | 115 | 125 | 110 |

| | Example 6 | Example 7 | Example 8 | Example 9 | Example 10 |
|---|---|---|---|---|---|
| With or without first sipe | Yes | Yes | Yes | Yes | Yes |
| Length of steeply inclined portion L2/Wa | 1.2 | 1.2 | 1.2 | 1.2 | 1.2 |
| Groove width of first lug groove W1 (mm) | 5 | 4 | 4 | 4 | 4 |
| Length of first lug groove L1/Wa (%) | 35 | 20 | 50 | 35 | 35 |
| Angle θ2 (degrees) between steeply inclined portion and gently inclined portion | 125 | 125 | 125 | 115 | 135 |
| Steering stability performance on dry road surface [score: the higher the numerical value, the better] | 95 | 105 | 95 | 100 | 95 |
| Snowy road performance [index: the higher the numerical value, the better] | 120 | 110 | 120 | 115 | 120 |

The result of the tests was that it could be confirmed that the tires of Examples had enhanced snowy road performance while deterioration in steering stability performance on a dry road was inhibited as compared with the tire of Comparative example.

What is claimed is:

1. A tire comprising a tread portion which includes:
   a first main groove and a second main groove which extend continuously in a tire circumferential direction; and
   a first land portion partitioning the first main groove from the second main groove, wherein
   at least two first lug grooves and a first sipe are provided in the first land portion,
   wherein one of the first lug grooves includes one end communicating with the first main groove and another end terminating in the first land portion,
   the first sipe includes one end communicating with the second main groove and another end communicating with the another end of the one of the first lug grooves, and
   the first sipe includes:
   a steeply inclined portion extending from the another end of the one of the first lug grooves and having an angle with respect to the tire circumferential direction smaller than that of the one of the first lug grooves, wherein the steeply inclined portion and the one of the first lug grooves are inclined in the same direction with respect to a tire axial direction; and
   a gently inclined portion extending from the steeply inclined portion to the second main groove and having an angle with respect to the tire circumferential direction larger than that of the steeply inclined portion, wherein a virtual line extending over the gently inclined portion overlaps another one of the first lug grooves adjacent to the one of the first lug grooves communicating with the gently inclined portion in the tire circumferential direction.

2. The tire according to claim 1, wherein
   the tread portion includes an outer tread end and an inner tread end which are respectively positioned on an outer side of and inside a vehicle when being attached to the vehicle, and
   the second main groove is provided on the outer tread end side with respect to the first main groove.

3. The tire according to claim 2, wherein a length in the tire circumferential direction of the steeply inclined portion is larger than a maximum width in a tire axial direction of the first land portion.

4. The tire according to claim 2, wherein
   a second lug groove including one end communicating with the second main groove and another end terminating in the first land portion is provided in the first land portion, and
   the second lug groove and the steeply inclined portion are formed at positions superimposed on each other when viewed in a tire axial direction.

5. The tire according to claim 2, wherein the first land portion includes a pair of first land portion edges extending along the first main groove and the second main groove, and
   each of the first land portion edges includes a convex portion protruding toward an outer side of the first land portion and a concave portion recessed toward an inner side of the first land portion which are alternately provided in the tire circumferential direction.

6. The tire according to claim 1, wherein a length in the tire circumferential direction of the steeply inclined portion is larger than a maximum width in a tire axial direction of the first land portion.

7. The tire according to claim 6, wherein
   a second lug groove including one end communicating with the second main groove and another end terminating in the first land portion is provided in the first land portion, and
   the second lug groove and the steeply inclined portion are formed at positions superimposed on each other when viewed in a tire axial direction.

8. The tire according to claim 6, wherein
   the first land portion includes a pair of first land portion edges extending along the first main groove and the second main groove, and
   each of the first land portion edges includes a convex portion protruding toward an outer side of the first land portion and a concave portion recessed toward an inner side of the first land portion which are alternately provided in the tire circumferential direction.

9. The tire according to claim 1, wherein
   a second lug groove including one end communicating with the second main groove and another end terminating in the first land portion is provided in the first land portion, and
   the second lug groove and the steeply inclined portion are formed at positions superimposed on each other when viewed in a tire axial direction.

10. The tire according to claim 9, wherein
    the first land portion includes a pair of first land portion edges extending along the first main groove and the second main groove, and
    each of the first land portion edges includes a convex portion protruding toward an outer side of the first land portion and a concave portion recessed toward an imier side of the first land portion which are alternately provided in the tire circumferential direction.

11. The tire according to claim 1, wherein
    the first land portion includes a pair of first land portion edges extending along the first main groove and the second main groove, and
    each of the first land portion edges includes a convex portion protruding toward an outer side of the first land portion and a concave portion recessed toward an inner side of the first land portion which are alternately provided in the tire circumferential direction.

12. The tire according to claim 11, wherein a pair of second sipes extending from opposite ends in the tire circumferential direction of the concave portion facing the first main groove are provided in the first land portion.

13. The tire according to claim 12, wherein
    a second land portion adjacent to the first land portion with the first main groove interposed therebetween is provided in the tread portion,
    the second land portion includes a second inner land portion edge extending along the first main groove,
    the second inner land portion edge includes a second inner convex portion protruding toward an outer side of the second land portion and a second inner concave portion recessed toward an inner side of the second land portion which are alternately provided in the tire circumferential direction, and
    the second inner concave portion and the convex portion facing the first main groove are formed at positions superimposed on each other when viewed in a tire axial direction.

14. The tire according to claim 11, wherein
    a second land portion adjacent to the first land portion with the first main groove interposed therebetween is provided in the tread portion, the second land portion includes a second inner land portion edge extending along the first main groove, the second inner land portion edge includes a second inner convex portion protruding toward an outer side of the second land portion and a second inner concave portion recessed toward an inner side of the second land portion which are alternately provided in the tire circumferential direction, and the second inner concave portion and the convex portion facing the first main groove are formed at positions superimposed on each other when viewed in a tire axial direction.

\* \* \* \* \*